United States Patent [19]

Tagawa et al.

[11] Patent Number: 5,447,330
[45] Date of Patent: Sep. 5, 1995

[54] AIR BAG HAVING FLAMEPROOF SHEET PROTECTING INFLATOR AND VENT REGION

[75] Inventors: Masato Tagawa; Yoshiyuki Baba, both of Shiga, Japan

[73] Assignee: Takata Corporation, Tokyo, Japan

[21] Appl. No.: 133,314

[22] Filed: Oct. 8, 1993

[30] Foreign Application Priority Data

Oct. 30, 1992 [JP] Japan .................................. 4-292917

[51] Int. Cl.⁶ ...................... B60R 21/28; B60R 21/16
[52] U.S. Cl. .................................. 280/739; 280/743.1
[58] Field of Search .............. 280/743 R, 731, 728 R, 280/728 A, 739

[56] References Cited

U.S. PATENT DOCUMENTS 5,100,168  3/1992  Horiuchi et al. ............... 280/743 R

FOREIGN PATENT DOCUMENTS 485605      5/1992   European Pat. Off. ......... 280/743 R
4-113953    4/1992   Japan ............................... 280/743 R
WO91/18760 12/1981   WIPO ............................. 280/743 R Primary Examiner—Karin L. Tyson
Attorney, Agent, or Firm—Kanesaka & Takeuchi

[57] ABSTRACT

An air bag is formed of an opening formed at the rear end for receiving an inflator; a vent hole formed in the rear face; and reinforcing cloth patches sewn by threads to the peripheral edges of the opening and the vent hole. The air bag further includes a heat resisting sheet formed continuously on the inner face of the air bag over the opening and the vent hole for covering and protecting the threads.

2 Claims, 4 Drawing Sheets

AIR BAG HAVING FLAMEPROOF SHEET PROTECTING INFLATOR AND VENT REGION

BACKGROUND OF THE INVENTION

Field of the Invention

The present invention relates to an air bag of an air bag system mounted on a vehicle for protecting an occupant at the time of a vehicular collision.

Description of the Related Art

An air bag system mounted for a driver's seat or in an instrument panel is constructed to have its air bag extended quickly with the gas injected from an inflator (or gas generator) when the vehicle collides.

This air bag is made of cloth and is formed at its rear end with an opening for receiving the inflator and at its rear face with vent holes. The air bag is sewed by threads with reinforcing cloth patches at the peripheral edges of those opening and vent holes.

When the extended air bag is hit by the human body, it releases the internal gas through the vent holes to the outside to damp the shock to the body.

When the inflator is activated to inject the gas, the threads sewing the reinforcing cloth patches are exposed to a high temperature because the gas is considerably hot. This makes it necessary for the threads to be made of heat-resisting materials such as aramid fibers (i.e., aromatic polyamide fibers) so that the cost is accordingly raised. On the other hand, most of the heat-resisting fibers are thick to stiffen the portions reinforced with the cloth patches, thus raising another problem of making the air bag hard to fold.

Alternatively, the threads are made heat-resistant by coating them with silicone resin or rubber. This method also causes the problems of high cost and difficulty in folding the air bag.

OBJECT AND SUMMARY OF THE INVENTION

The present invention has an object to solve the aforementioned problems of the prior art and to provide an air bag in which the reinforcing patches have their sewing threads protected sufficiently from the hot gas coming from the inflator.

According to the present invention, there is provided an air bag for use with a vehicular air bag system having an inflator, which comprises: an opening formed at the rear end for receiving the inflator; a vent hole formed in the rear face for releasing the gas from the inside; and reinforcing cloth patches sewn by threads to the peripheral edges of the opening and the vent hole, wherein a heat-resisting cover for protecting the threads is provided which covers the inner face of the air bag over an area from the opening to the periphery of the vent hole.

The cover is preferably a sheet or cloth of soft rubber and/or a synthetic resin. The cover may be a coating of the same material. The rubber is preferably silicone rubber or chloroprene rubber. The synthetic resin is preferably nylon or polyester. The cover is preferably thin, flexible and sufficiently heat-resisting.

In the air bag of the present invention, the threads sewing the reinforcing cloth patches are covered with the heat-resisting cover so that they are prevented from being exposed directly to the hot gas. This makes it possible to use the threads which are thin, flexible and less heat-resisting.

Moreover, the cover is provided in the area from the inflator receiving hole to the periphery of the vent hole continuously, so that the air bag has a smooth inner face at the area. As a result, the gas injected from the inflator flows smoothly along the inner face of the air bag so as to extend the air bag smoothly.

DESCRIPTION OF THE PREFERRED EMBODIMENTS

Figure 1:
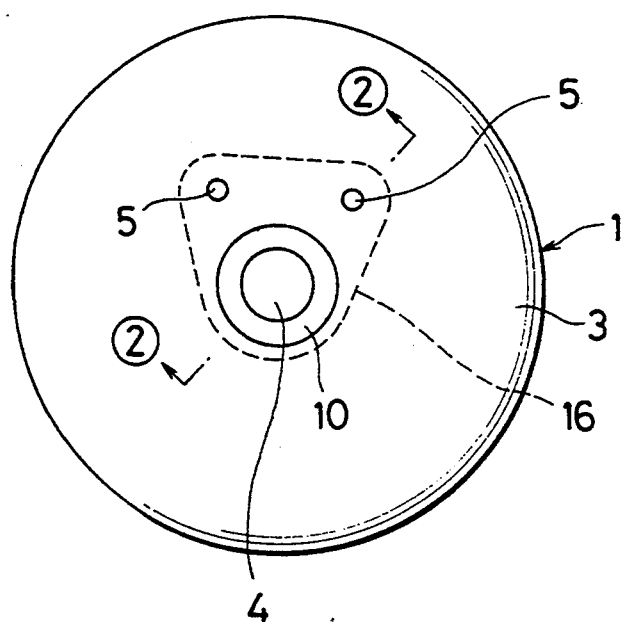
FIG. 1 is a back elevation showing an air bag according to an embodiment of the present invention.
Figure 2:
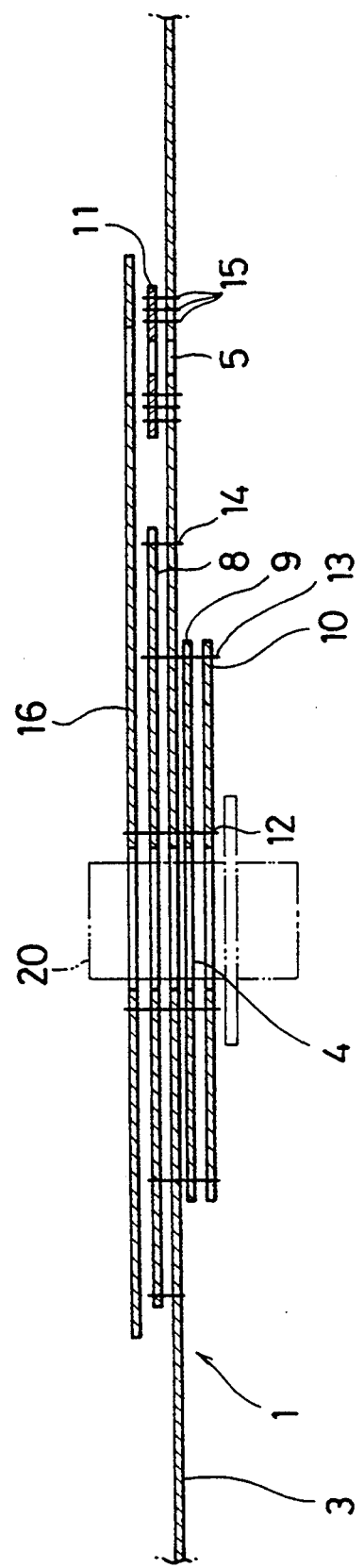
FIG. 2 is a section taken along ②—② of FIG. 1.
Figure 3:
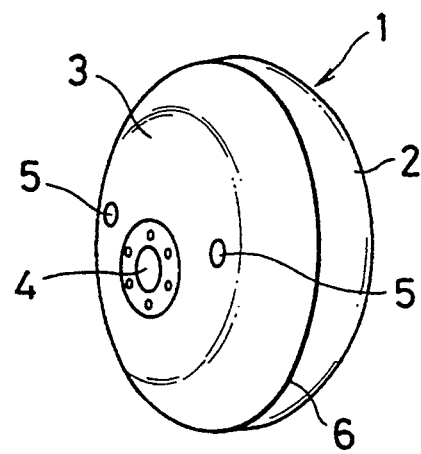
FIG. 3 is a perspective view showing the air bag.
Figure 5:
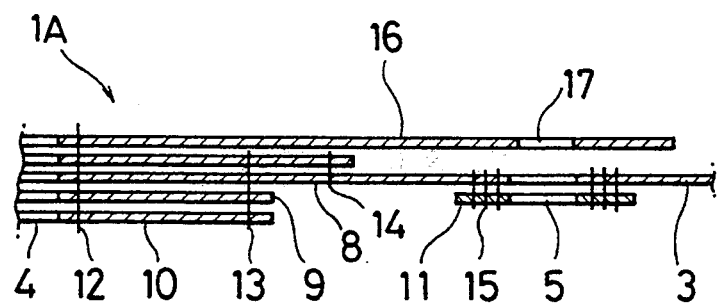
FIG. 5 is a section taken along ⑤—⑤ of FIG. 4.

The present invention will be described in the following in connection with its embodiments with reference to the accompanying drawings. FIG. 1 is a back elevation showing an air bag for a driver according to an embodiment of the present invention; FIG. 2 is a section taken along ②—② of FIG. 1; and FIG. 3 is a perspective view showing the air bag. Here, the cloths are illustrated in FIG. 2 and FIG. 5 to have gaps between them, and this illustration is intended to facilitate the understanding. As a matter of fact, however, the cloths overlap each other.

The air bag 1 is formed into a bag shape by sewing a front panel 2 and a rear panel 3. The rear panel 3 is formed with an opening 4 for receiving (or mounting) an inflator and two vent holes 5. The front panel 2 and the rear panel 3 are sewn by threads with their margins overlapping each other. Reference numeral 6 designates the sewn portion of the front and rear panels 2 and 3.

The inflator mounting opening 4 and the vent holes 5 have their outer peripheral portions sewn by threads 12 to 15 by applying ring-shaped reinforcing cloth patches 8 to 11 individually to the peripheral portions.

The sewing threads 12 to 15 are covered with a flameproofed cloth 16. The flameproofed cloth 16 is sewn to the rear panel 3 by the sewing thread 12. The flameproofed cloth 16 is impregnated with a flame-proofing agent. A hole 17 is formed in the flameproofed cloth 16 at a position overlapping each of the vent holes 5.

In the air bag 1 thus constructed, the threads 13 to 15 sewing the reinforcing cloth patches 8 to 11 are covered with the flameproofed cloth 16 so that they are kept away from any direct exposure to the hot gas. As a result, the threads 13 to 15 can be thin, flexible and less heat-resisting.

Moreover, the flameproofed cloth 16 covers continuously the area from the inflator mounting opening 4 to the periphery of the vent holes 5, so that the air bag has a smooth inner face on the area of the air bag 1. As a result, the gas injected from the inflator (as designated by double-dotted lines 20 in FIG. 2) flows smoothly along the inner face of the air bag 1 to extend the air bag 1 smoothly.

Incidentally, the thread 12 is exposed directly to the hot gas, but the air bag 1 is not folded back at the portion of the thread 12. Thus, the thread 12 can be thick and heat-resisting.

Figure 4:
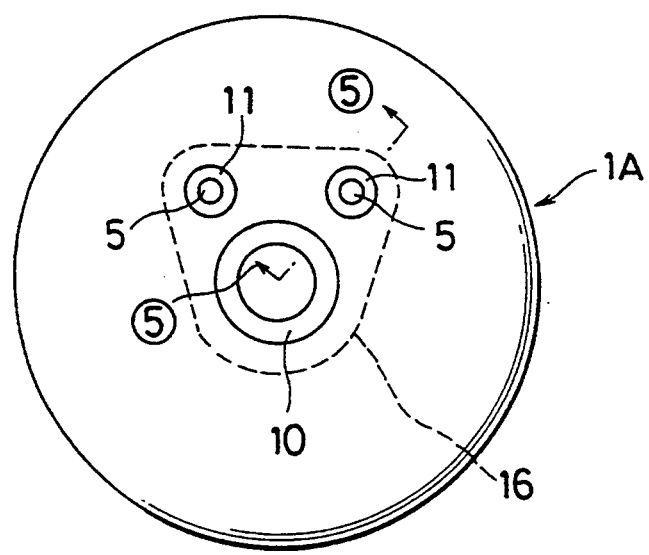
FIG. 4 is a back elevation showing an air bag according to another embodiment.

The reinforcing cloth patch 11 is arranged on the inner face of the air bag 1 in the embodiment of FIGS. 1 to 3 but may be arranged on the outer face, as shown in the air bag 1A of FIGS. 4 and 5 in accordance with the present invention. Incidentally, the remaining construction of FIGS. 4 and 5 is similar to that of FIGS. 1 and 2 so that the common reference numerals designate the identical portions.

The number of reinforcing cloth patches 8 to 11 and the shape of the flameproofed cloth 18, as shown, just embody the present invention and may apparently be modified from the shown ones. Moreover, the flameproofed cloth may be replaced by a film or sheet of a nonflammable synthetic resin. Then, the air bag may be continuously covered over area from the inflator mounting opening to the periphery of the vent hole with a nonflammable synthetic resin.

Figure 6:
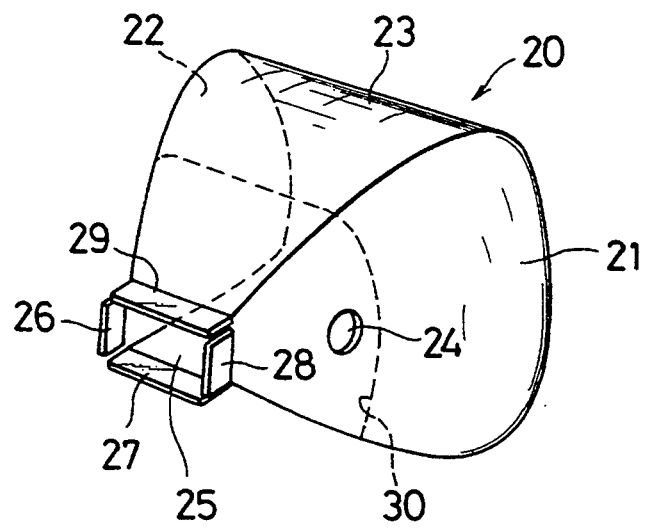
FIG. 6 is a perspective view showing an air bag for a passenger according to the embodiment.

FIG. 6 is a perspective view showing an air bag 20 for a passenger in accordance with another embodiment of the present invention. The air bag 20 is constructed by sewing a pair of side panels 21 and 22 and a center panel 23. The side panels 21 and 22 are individually formed with vent holes 24. The air bag 20 has its rear portion formed with an opening 25 for introducing the inflation gas. This opening 25 is equipped at its edges with flaps 26, 27, 28 and 29 for mounting the air bag 20 on the container. Reinforcing cloth patches are individually sewn to the peripheral edges of the opening 25 and the vent holes 24. The air bag 20 has its inner face covered with a flameproofed cloth 30 all over the area from the flaps 26, 27, 28 and 29 to the periphery of the vent holes 24. The flameproofed cloth 30 may be replaced by a film or sheet of a nonflammable synthetic resin or coated with the nonflammable synthetic resin.

In the air bag of the present invention, as described above, since the threads sewing the reinforcing cloth patches are covered with the heat-resisting cover, the threads may be thin, flexible and less heat-resisting. As a result, inexpensive threads can be used to drop the production cost of the air bag. Moreover, the resultant seams can be flexible to facilitate folding of the air bag, if necessary, into a small shape.

What is claimed is:

1. An air bag for use in a vehicular air bag system having an inflator, comprising:
    an air bag panel for constituting an air bag;
    an opening formed at a rear portion of the air bag panel for receiving the inflator therein;
    at least one vent hole formed at the rear portion of the air bag panel near and at one side of the opening;
    reinforcing cloth patches fixed to peripheries of the opening and the vent hole;
    first threads for sewing the reinforcing cloth patch for the vent hole and for sewing a portion of the reinforcing cloth patch for the opening, said portion being located away from the opening, said first threads being thin and flexible and being made of a material not strong against hot gas ejected from the inflator;
    a heat-resisting sheet covering a periphery around the opening and extending from the periphery around said opening only toward the vent hole up to the periphery of the vent hole at a side away from the opening to completely cover the reinforcing cloth patch for the vent hole, said heat-resisting sheet being sewn to the air bag panel only at said periphery around the opening and having a hole at a position overlapping the vent hole to allow gas in the air bag to release to outside through the hole in the heat-resisting sheet and the vent hole; and
    a second thread for sewing the reinforcing cloth patch for the opening and said heat-resisting sheet to the air bag panel at said periphery around the opening, said second thread being made of a heat-resisting material so that when the inflator is actuated, the heat-resisting sheet is surely fixed to the air bag panel without being affected by the hot gas ejected from the inflator and prevents direct contact of the hot gas from the inflator to the first threads.

2. An air bag according to claim 1, wherein said heat-resisting sheet is a nonflammable cloth.

* * * * *